(No Model.)
G. S. STRONG.
FIELD MAGNET CORE FOR DYNAMOS OR MOTORS.
No. 505,539. Patented Sept. 26, 1893.
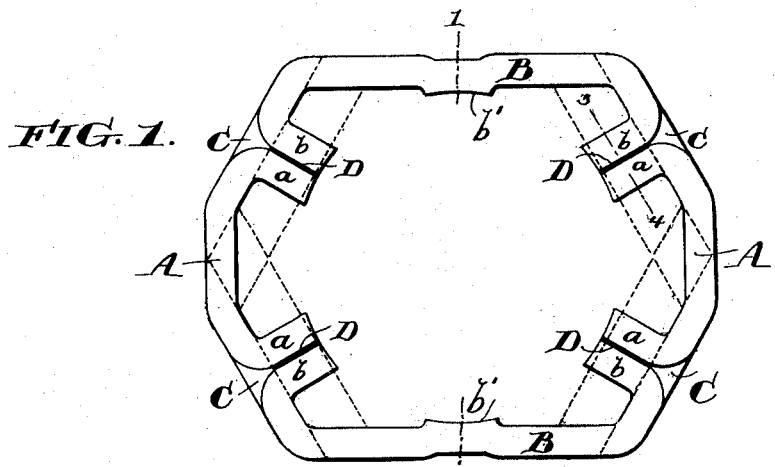
FIG. 1.
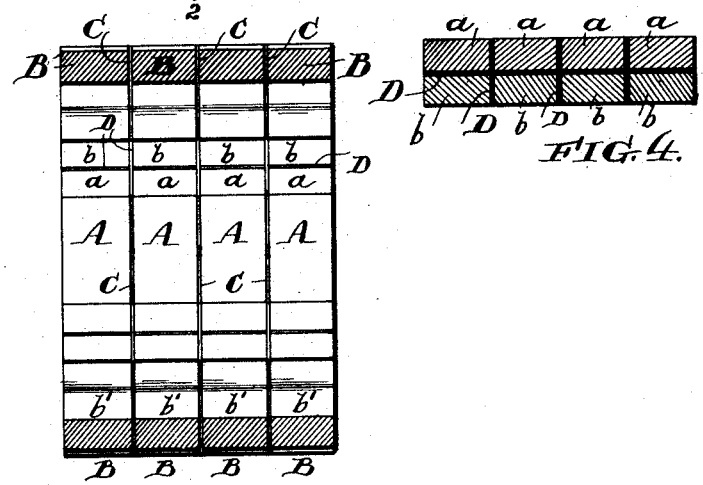
FIG. 2.
FIG. 4.
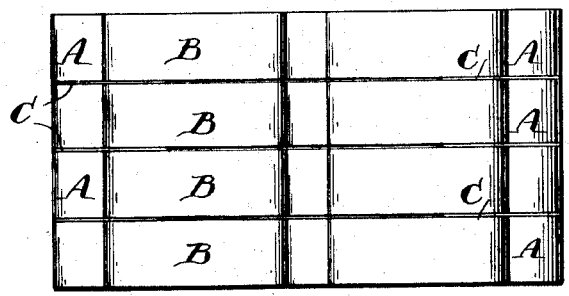
FIG. 3.
Witnesses:
Inventor:
George S. Strong
by his atty.

UNITED STATES PATENT OFFICE.

GEORGE S. STRONG, OF NEW YORK, N. Y., ASSIGNOR TO JAMES N. GAMBLE, OF CINCINNATI, OHIO.

FIELD-MAGNET CORE FOR DYNAMOS OR MOTORS.

SPECIFICATION forming part of Letters Patent No. 505,539, dated September 26, 1893.

Application filed February 3, 1892. Serial No. 420,166. (No model.)

*To all whom it may concern:*

Be it known that I, GEORGE S. STRONG, of the city and county of New York, State of New York, have invented a certain new and useful Improved Field-Magnet Core for Dynamos or Electric Motors, of which the following is a true and exact description, reference being had to the accompanying drawings, which form a part of this specification.

My invention relates to the construction of field magnet cores for dynamos or electric motors and has for its object to so construct the same as to secure the greatest possible power in the field magnet core having the least possible weight, this being especially important where the field magnet core is part of an electric motor to be used in propelling street cars and the like. Generally speaking, my improved core is of an elongated form provided with two salient or wound poles at each of its shorter ends and with a consequent pole in the center of each of its longer sides. As the consequent poles need project but very little from the face of the bar their presence does not materially increase the vertical space occupied and I thus obtain a six pole field magnet core having four salient and two consequent poles and which will occupy the least possible vertical distance. Preferably I construct my field magnet core of bars welded or bolted together using devices for insulating those parts of the bars which form part of the poles and for tying the different bars together so as to gain at once strength in the whole structure and an ample conducting section. But these details will be best understood as described in connection with the drawings in which my invention is illustrated and in which—

Figure 1 is a plan view of the field magnet core; Fig. 2 a cross-sectional view on the line 1—2 of Fig. 1; Fig. 3 a side elevation; and Fig. 4 a cross-section through one of the poles on the line 3—4 of Fig. 1.

A A are bars preferably formed from straight wrought iron bars bent to the horseshoe form shown though it will be understood that the bar with the inwardly-curved ends may be formed in any convenient way. B B are similar bars of greater length having also inwardly-curved ends $b$ and also projections $b'$ which make up the consequent poles, being situated midway between the ends $b\ b$. The curvature of the ends is such that when they are abutted together as shown in Fig. 1, a core of the desired shape is formed—the abutting ends, $a$ and $b$, forming the salient or wound poles of the electro-magnet. The field magnet core should be built up of a number of bars A and B piled together as shown in Figs. 2, 3 and 4—four such bars being used in the construction of each section of the core. Insulating material, as indicated at D, should be placed between each of the parts $a$ and $b$ of each pole and the different parts $b'$ which overlie each other should also be insulated in the same way. Then to obtain ample conducting surface as well as to give the core proper rigidity and strength, I employ tie-bars C which pass between the overlying bars A A and extending out pass between the corresponding bars B B of the longer side of the core. These tie plates are preferably arranged as shown outside of the poles $a\ b$ and the insulation D between them, so that the plates will not interfere with the proper insulation of the parts $a\ b$ of the pole. The different parts having been arranged as above described, can then be secured together by clamps, bolts or by welding. And I will here mention that the process of making a field magnet core from bent wrought iron bars piled and welded together as above indicated, as well as the field magnet core so made, is claimed by me in another application for Letters Patent filed January 30, 1892, Serial No. 419,818; and I would also note that in another application filed by me February 6, 1892, Serial No. 420,538, I claim specifically a construction of bars like the bars B when formed by bending wrought iron bars so as to form salient and consequent poles thereon. It is obvious of course that the tie-plates C can be usefully applied in the construction of field magnet cores of different form from that shown in the drawings and it will therefore be understood that in claiming the use of such tie-plates I do not intend to limit myself to the specific form of core which I have shown and especially claimed.

Having now described my invention, what I claim as new, and desire to secure by Letters Patent, is—

1. A field magnet core for dynamos and electric motors having an elongated form with two salient poles on each of its shorter sides and a consequent pole on each of its longer sides.

2. A field magnet core for dynamos and electric motors consisting of two sets of long bars B B with inwardly-curved ends $b$ and consequent poles $b'$ formed in their centers, and two sets of shorter bars A A having inwardly-curved ends $a$ adapted to abut against the ends $b$ of bars B, the abutting ends $a$ $b$ forming salient poles of the field magnet, all substantially as and for the purpose specified.

3. A field magnet core for dynamos or electric motors consisting of a series of bars bent to a horseshoe form and abutted together so that their bent ends will form poles, in combination with insulating material inserted between the bent ends which form parts of each pole and tie-plates outside of the insulating material and extending between the bars of adjoining sets substantially as described.

GEORGE S. STRONG.

Witnesses:
LEWIS R. DICK,
J. H. RUSSELL.